(12) United States Patent
Frank

(10) Patent No.: US 10,891,564 B2
(45) Date of Patent: Jan. 12, 2021

(54) TESTING PROTOCOL COMPATABILITY

(75) Inventor: Joachim H. Frank, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 2930 days.

(21) Appl. No.: 11/695,151

(22) Filed: Apr. 2, 2007

(65) Prior Publication Data

US 2008/0240153 A1    Oct. 2, 2008

(51) Int. Cl.
*G06F 9/54* (2006.01)
*G06Q 10/06* (2012.01)
*H04L 29/06* (2006.01)

(52) U.S. Cl.
CPC ............. *G06Q 10/06* (2013.01); *H04L 69/02* (2013.01)

(58) Field of Classification Search
USPC .......... 705/1, 1.1, 26, 37; 707/104; 370/229, 370/466; 714/39
See application file for complete search history.

(56) References Cited

U.S. PATENT DOCUMENTS

| | | | | |
|---|---|---|---|---|
| 5,208,748 | A * | 5/1993 | Flores | G06Q 10/10 704/1 |
| 5,768,498 | A * | 6/1998 | Boigelot et al. | 714/39 |
| 6,073,113 | A * | 6/2000 | Guinan | G06Q 20/00 705/26 |
| 6,345,042 | B1 | 2/2002 | Musial | |
| 6,373,822 | B1 | 4/2002 | Raj et al. | |
| 6,829,769 | B2 | 12/2004 | Cranston et al. | |
| 7,124,110 | B1 * | 10/2006 | Kemp, II | G06Q 40/04 705/37 |
| 2002/0013759 | A1 * | 1/2002 | Stewart | G06Q 40/04 705/37 |
| 2002/0083213 | A1 | 6/2002 | Oberstein et al. | |

(Continued)

FOREIGN PATENT DOCUMENTS

JP    2004328195 A2    11/2004

OTHER PUBLICATIONS

Component-Based Software Development for Embedded Systems: An Overview of Current Research Trends, Nov. 19, 2005; Atkinson Colin; Bunse, Christian; Gross, Hans-Gerhard; Peper, Christian; Table of Contents, Introduction, Cover Page, pages 94-96.*

(Continued)

*Primary Examiner* — Lynda Jasmin
*Assistant Examiner* — Kimberly L Evans
(74) *Attorney, Agent, or Firm* — Christopher M. Pignato

(57) ABSTRACT

Embodiments of the present invention address deficiencies of the art in respect to conversation protocol validation and provide a method, system and computer program product for testing protocol compatibility between trading partners in a B2B conversation. In one embodiment of the invention, a method for testing protocol compatibility between roles in a B2B conversation can be provided. The method can include selecting at least two roles from amongst global process models, constructing local protocols for each of the selected roles, generating a conversation protocol from the constructed local protocols, and detecting dead-end states in the generated conversation protocol to identify protocol incompatibility while identifying protocol compatibility in the absence of dead-end states in the generated conversation protocol.

11 Claims, 3 Drawing Sheets

(56) References Cited

U.S. PATENT DOCUMENTS

| | | | |
|---|---|---|---|
| 2002/0099977 A1 | 7/2002 | Wong | |
| 2003/0002526 A1* | 1/2003 | Dias | G06Q 30/06 |
| | | | 370/466 |
| 2003/0144860 A1 | 7/2003 | Casti et al. | |
| 2005/0027738 A1* | 2/2005 | Kraft | G06Q 10/10 |
| | | | 707/104 |
| 2005/0097212 A1 | 5/2005 | Engel et al. | |
| 2007/0064598 A1* | 3/2007 | Nooner et al. | 370/229 |

OTHER PUBLICATIONS

Component-Based Software Development for Embedded Systems: An Overview of Current Research Trends, Nov. 19, 2005; Atkinson Colin; Bunse, Christian; Gross, Hans-Gerhard; Peper, Christian; Table of Contents, Introduction, whole book, pp. 82-85, pp. 94-105.*
www.ebxml.org/specs/index.htm# whitepapers, "Collaboration-Protocol Profile and Agreement Specification Version 2.0", by OASIS ebXML Collaboration Protocol Profile and Agreement Technical (Sep. 23, 2002), entire document.*
www.ebxml.org/specs/index.htm# whitepapers, "Collaboration-Protocol Profile and Agreement Specification Version 2.0", by OASIS ebXML Collaboration Protocol Profile and Agreement Technical (Sep. 23, 2002), entire document. (Year: 2002).*
Han, et al; Ensuring Compatible Interactions Within Component-Based Software Systems; APSEC'03; 2003 IEEE.

\* cited by examiner

TESTING PROTOCOL COMPATABILITY

BACKGROUND OF THE INVENTION

1. Field of the Invention

The present invention relates to the field of conversation protocol validation in e-business and more particularly to business-to-business (B2B) conversation protocol validation.

2. Description of the Related Art

E-business refers to the conduct of business through electronic transactions conducted between transaction partners over a computer communications network. E-business often involves the exchange of business-to-business (B2B) transactions between trading partners over large computer communications networks. In this regard, B2B transactions aim to automate business processes and, as a result, to reduce the traditional processing delays and inefficiencies associated with manual processes.

B2B integration relates to the coordination of B2B transaction messages in a conversation between different e-business processes associated with respectively different trading partners in a B2B relationship. To enable B2B integration, a number of conversation protocols have been developed, including the venerable Electronic Data Interchange (EDI). Modern conversation protocols differ from EDI and include, by way of example, RosettaNet(™) a partner interface process managed by the RosettaNet non-profit organization of Los Angeles, Calif., United States.

In B2B interactions, each trading partner assumes a certain conversation protocol. A conversation protocol in a B2B interaction includes a set of messages exchanged between the partners, the message types and the ordering of the messages. To ensure that trading partners can interact, their protocols must be compliant. Protocol compliance refers to the requirement that at each point in the conversation at least one of the participants continues the message exchange in a way that is acceptable for the other participant and will eventually lead to the completion of the conversation from both partners' viewpoints. Protocol compliance normally is verified manually by ensuring that the logic of each trading partner results in a message sequence that matches an expected message sequence of the other partners.

The most straightforward way to achieve protocol compliance is by agreeing on a single protocol (set of messages) to be followed by each participant. However, requiring adherence to a fixed message sequence can be rather limiting, especially when a partner aims to conduct business with a variety of others. Messages in a conversation protocol can be optional in nature, and optional in their sequencing. For example, while one partner may expect to receive a first message such as a payment message before sending a second message such as a goods message, the other partner may be prepared to receive the second message (the goods message) before or after sending the first message (the payment message). It is evident that permitting such variability in the expected message sequencing, which is very frequent in human business interactions, will facilitate electronic interactions with a larger variety of partners.

Notwithstanding, those conversation protocols will have to be compatible, so that if each party follows its own communications protocol, a conversation can proceed and complete normally. In fact, participants to the conversation cannot readily determine that the conversation protocol guiding the other trading partner differs from its own conversation protocol. Therefore, testing the compatibility of the different conversation protocols can be difficult.

BRIEF SUMMARY OF THE INVENTION

Embodiments of the present invention address deficiencies of the art in respect to conversation protocol validation and provide a novel and non-obvious method, system and computer program product for testing protocol compatibility between trading partners in a B2B conversation. In one embodiment of the invention, a method for testing protocol compatibility between roles in a B2B conversation can be provided. The method can include selecting at least two roles from amongst global processes that define the interaction behavior of the selected roles with partner roles, constructing local protocols for each of the selected roles, generating a conversation protocol from the constructed local protocols, and detecting dead-end states in the generated conversation protocol to identify protocol incompatibility while identifying protocol compatibility in the absence of dead-end states in the generated conversation protocol.

In another embodiment of the invention, a data processing system configured for testing protocol compatibility between roles in a B2B conversation can be provided. The system can include one or more global process models disposed in a data processing system. Two or more different local protocols further can be provided, or derived from the interaction behavior of roles in a global process, each corresponding to a different swimlane in one of the global process models. A conversation protocol yet further can be provided as produced by a product of the two or more different local protocols. Finally, protocol compatibility logic can be disposed in the data processing system. The logic can include program code enabled to detect dead end states in the conversation protocol to identify protocol incompatibility.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for testing protocol compatibility between roles in a B2B conversation. In accordance with an embodiment of the present invention, different roles from amongst one or more global process models can be selected for protocol compatibility testing. For each selected role, a local protocol can be constructed or received as representative of a role in a global process model. Subsequently, the product of the constructed local protocols can be computed to produce a conversation protocol for the selected roles. Finally, the conversation protocol can be analyzed to detect the presence of dead-end states. To the extent that no dead-end states are detected, the local protocols for the selected roles can be determined compatible in that the selected roles can interact.

Figure 1:
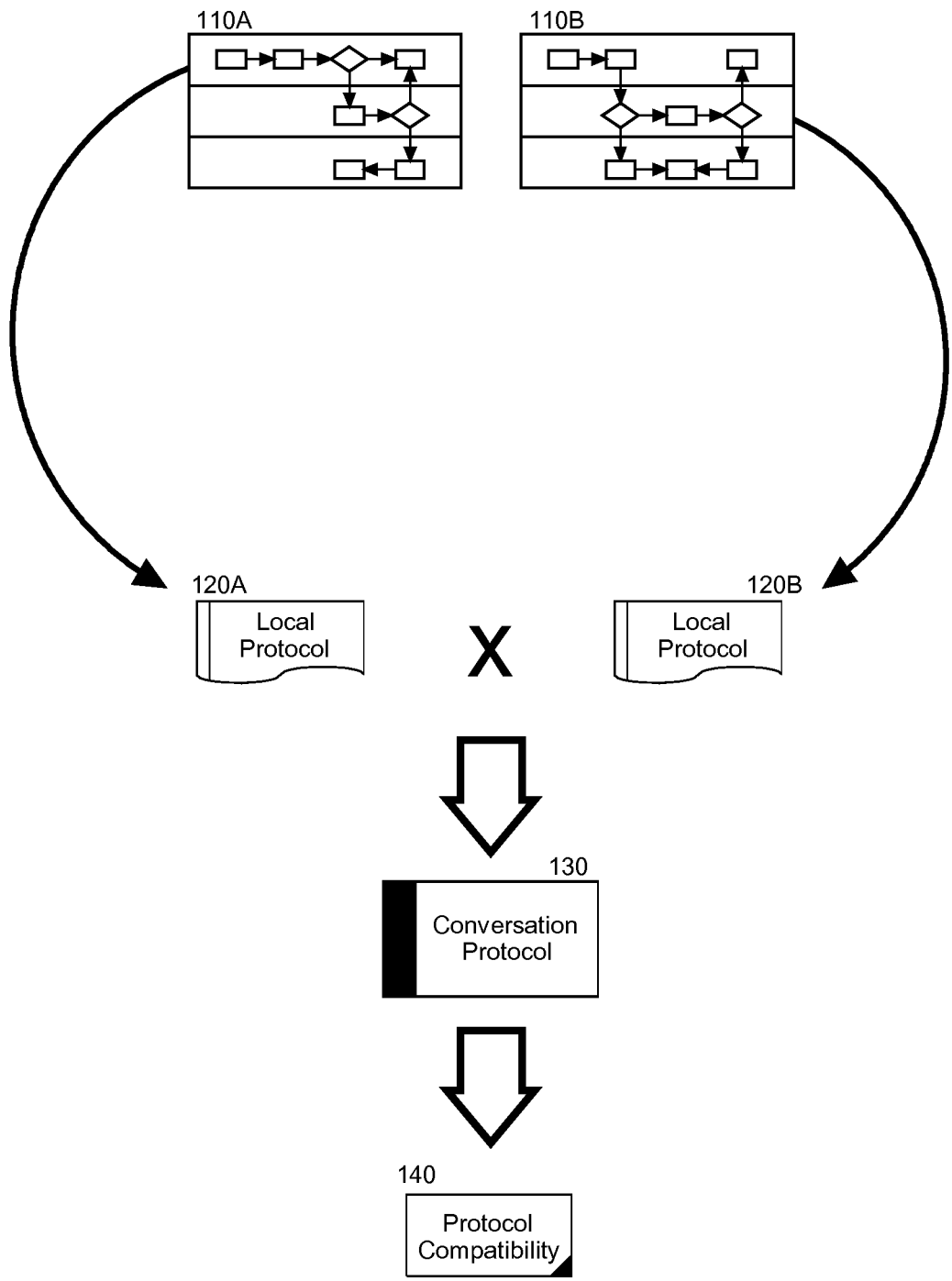
FIG. 1 is a block diagram illustrating a process for testing protocol compatibility between roles in a B2B conversation.

In further illustration, FIG. 1 is a block diagram illustrating a process for testing protocol compatibility between roles in a B2B conversation. As shown in FIG. 1, different global process models 110A, 110B can include multiple different swim lanes for correspondingly different roles in a B2B conversation. Each swim lane can include a portion of a respective one of the global process models 110A, 110B and each portion of a global process model 110A, 110B in a swim lane can include transitions to and from other swim lanes, corresponding to messages sent and received by a participant associated with the role for the first swim lane with a participant associated with the role for the other swim lane.

A set of roles from amongst the global process models 110A, 110B can be selected for protocol compatibility testing. As such, corresponding local protocols 120A, 120B can be derived for each role in the selected set of roles. Once derived, a product of the local protocols 120A, 120B can be computed in order to produce a conversation protocol 130 for the local protocols 120A, 120B. Thereafter, protocol compatibility logic 140 can process the conversation protocol 130 in order to detect dead-end states in the conversation protocol 130. To the extent that no dead-end states are detected by the protocol compatibility logic 140, the local protocols 120A, 120B can be determined to be compatible in that the selected set of roles can interact.

Figure 2:
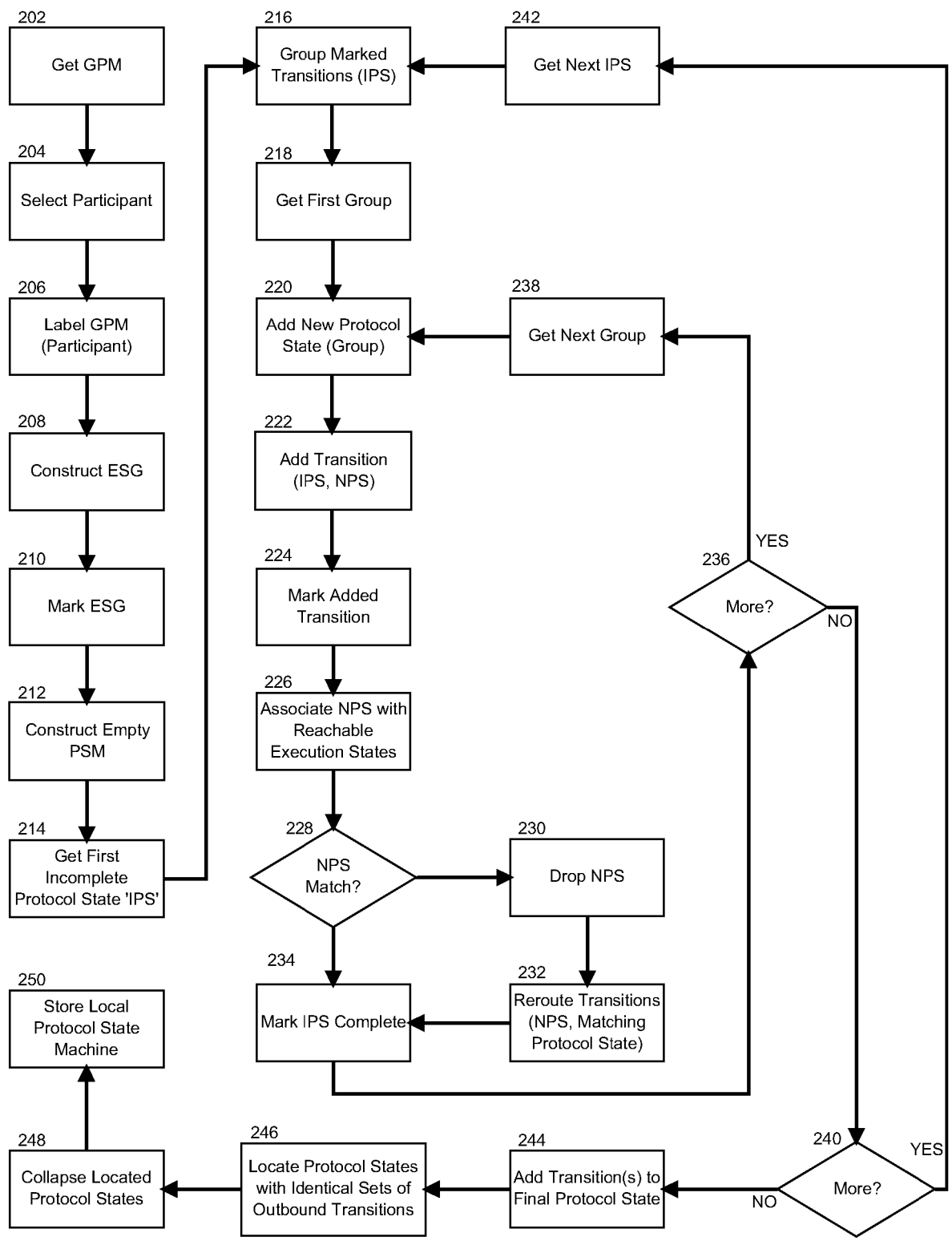
FIG. 2 is a flow chart illustrating a process for constructing a local protocol for a role in a B2B transaction; and, FIG. 3 is a flow chart illustrating a process for constructing an execution state graph from a local protocol for a role in a global process.

In more particular illustration, FIG. 2 is a flow chart illustrating a process for constructing a local protocol for a role in a B2B transaction. Beginning in block 202, a global process model can be selected and in block 204, a participant in the global process model can be chosen for whom a local protocol is to be derived. In block 206, each node and arc relating to the chosen participant in the global process model can be labeled. For instance, for an arc both crossing into and exiting from the swimlane for the chosen participant, two labels can be established. The first label can refer to the segment of the arc within the swimlane and the second label can refer to the segment of the arc external to the swimlane. Also, the same label for an arc can be applied to an adjacent node when the arc represents only an inbound flow into the node, or only an outbound flow out from the node and the node is not a join.

Figure 3:
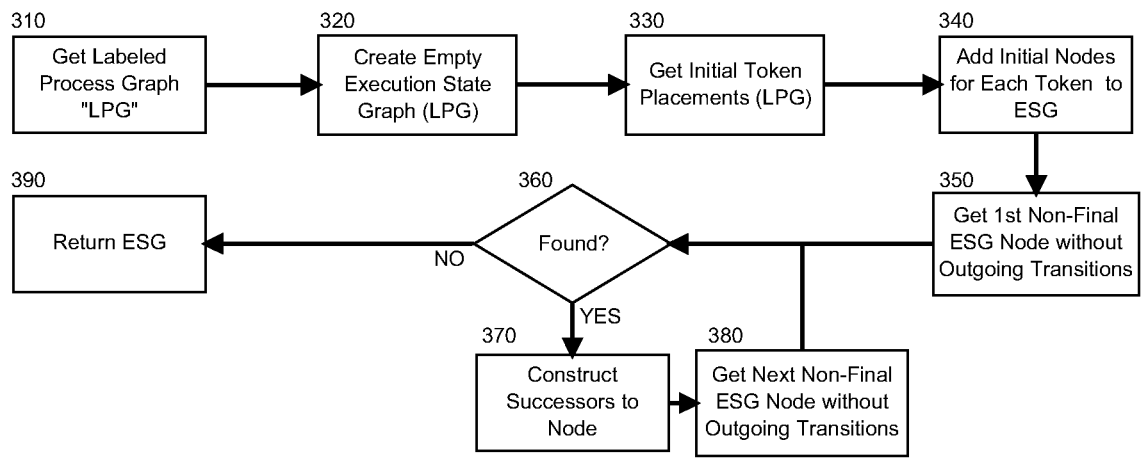

In block 208, an execution state graph can be constructed for the labeled global process model. The execution state graph can include a multiplicity of selectively interconnected nodes representing all legitimate token placements in a process wherein each edge or transition in the execution state graph corresponds to a single move of a token. In this regard, FIG. 3 is a flow chart illustrating a process for constructing an execution state graph from a local protocol for a role in a global process. Beginning in block 310, a labeled process graph can be retrieved for processing. In block 320, an empty execution state graph can be created and in block 330, a set of all initial token placements for the labeled process graph can be determined. In block 340, an initial node can be added to the empty execution state graph for each initial token placement in the set and each node can be associated with a corresponding token placement in the set.

In block 350, a first non-final node in the execution state graph can be located subject to the condition that the located node has no outgoing transitions and has not been marked final. Thereafter, in decision block 360, if a node can be found in the execution state graph that meets the condition, in block 370, successors to the node can be constructed. Specifically, all immediate successor token placements to the placement associated with the located node can be found. If a successor placement is found that is already associated with a node in the execution state graph, a transition can be added to the associated node. Otherwise, a new node can be added to the execution state graph that corresponds to the successor placement and a transition can be added from the located node to the added node. Finally, if an immediate successor placement to the one corresponding to the located cannot be found, the located node can be marked final.

In block 380, a next non-final execution state graph node can be located again subject to the condition that the located node has no outgoing transitions and has not been marked final. In decision block 360, if another node can be located that meets the condition, the process of constructing successors to the node can repeat in block 370. Otherwise, the creation of the execution state graph will be complete and can be returned for further processing in the flow of FIG. 2.

Returning to the flow of FIG. 2, in block 210, the newly constructed execution state graph can be marked for both send and receive transitions. Specifically, each transition of the execution state graph that corresponds to a token movement out of the swimlane can be marked "send <label>" where <label> is the label of the internal segment of the arc from which the token leaves the swimlane. Similarly, each transition of the execution state graph that corresponds to a token movement into the swimlane can be marked "receive <label>" where <label> is the label of the external segment of the arc from which the token enters the swimlane.

In block 212, an empty protocol state machine can be constructed from the execution state graph. To construct a protocol state machine from the execution state graph, an initial pseudo-state can be established and an unlabeled transition can connect the initial pseudo-state to a first protocol state. The first protocol state can be associated with all initial execution states and all execution states that can be reached transitively from an initial execution state via unmarked transitions. The resulting initial protocol state machine will have one state, which is not marked completed. Thereafter, in block 214, a first incomplete protocol state can be retrieved for processing.

In block 216, all marked transitions leaving from any of the first protocol state's associated execution states can be located and grouped by label within a corresponding marking. Subsequently, in block 218, a first group can be selected for processing. In block 220, a new protocol state can be added for the group. Additionally, in block 222 a transition can be added from the incomplete protocol state to the new protocol state. Yet further in block 224 the added transition can be marked in the same way as the grouped transitions that were selected in block 218. Finally, in block 226 the new protocol state can be associated with the execution states that are the targets of the transitions grouped in block 218 as well as all execution states that can be reached transitively from those through unmarked execution state graph transitions.

In decision block 228, it can be determined whether the new protocol state matches an existing protocol state in that the new protocol state has the same set of associated execution states. If so, in block 230 the new protocol state can be dropped from the protocol state machine and in block 232, the inbound transitions to the dropped protocol state can be re-routed to the existing protocol state matching the dropped protocol state. Finally, in block 234 the incomplete protocol state can be marked complete. In decision block 236, if additional groups remain to be processed, in block 238 the next group can be selected for processing and the flow can repeat through block 220.

When no further groups remain to be processed as determined within decision block 236, in decision block 240, it can be determined whether additional protocol states that have not yet been marked complete remain to be processed. If so, in block 242, the next incomplete protocol state can be retrieved and in block 216, once again different marked transitions can be grouped together and processed in blocks 218 through block 238.

In decision block 240, when no further incomplete protocol states remain, in block 244 a transition can be added to a final protocol state from any protocol state that is associated with a final state in the execution state graph. Also, in block 246 all protocol states having identical sets of outbound transitions can be located and in block 248, the located protocol states can be collapsed into one another by forming a union of each set of protocol states having identical outbound transitions. Finally, in block 250, the local protocol state machine can be stored in association with the swimlane of the participant for protocol compatibility testing with another protocol state machine.

Figure 4:
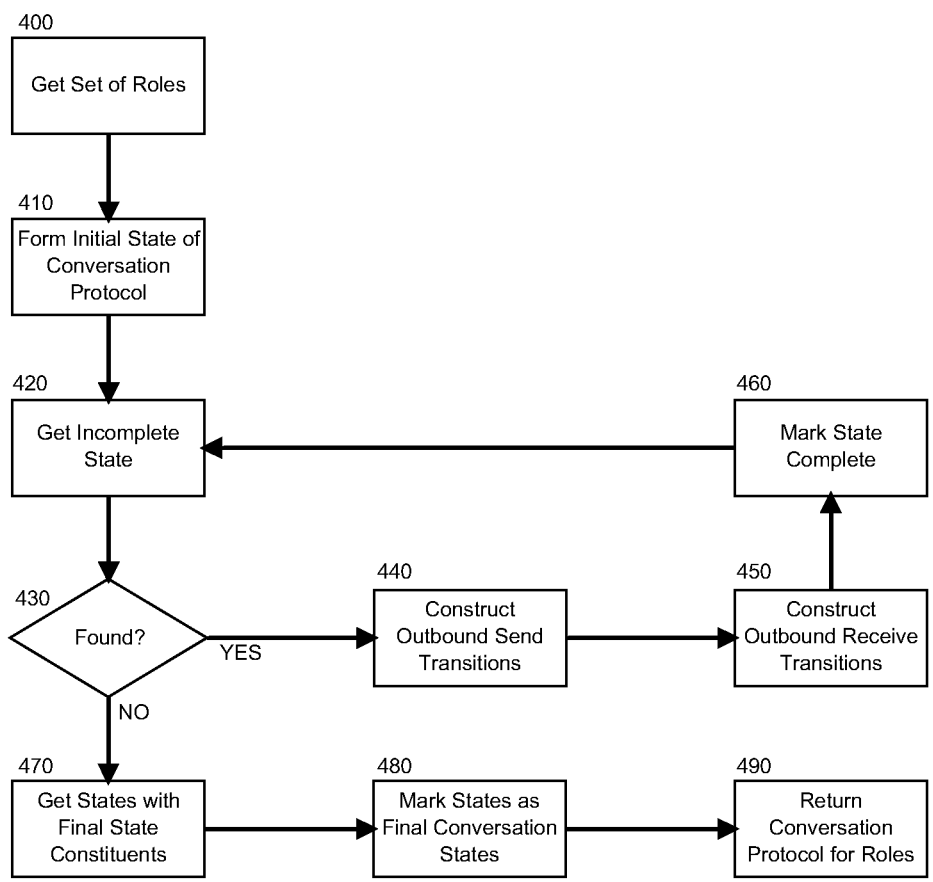
FIG. 4 is a flow chart illustrating a process for constructing a conversation protocol from different local protocols for selected roles to a B2B transaction.

Turning now to FIG. 4, a flow chart is shown depicting a process for constructing a conversation protocol from different local protocols for selected roles to a B2B transaction in order to test protocol compatibility between the different local protocols. Beginning in block 400, a set of roles can be selected for protocol compatibility testing. Each of the selected roles can include a local protocol whose transitions correspond to messages sent and received by a participant playing the selected role. In block 410, an initial state of a conversation protocol can be formed as the product of the initial states of each local protocol of one of the selected roles. In this regard, a state of the conversation protocol is a product of states of the local protocol of each role, augmented by a message count.

The message count can include a tuple of non-negative integers, one for each defined message that indicates the number of message instances "in flight" in the state. Additionally, the positions of each of the integers in tuple correspond to the different message types that participants may exchange. As such, messages sent to a participant increment a corresponding count in the tuple, whereas messages sent from the participant decrement the corresponding count in the tuple. The in-flight count is important to indicate which receive transitions enabled in a state (i.e. the participant is able to receive a message) can actually occur (e.g., the message can only be received after the counterpart has sent the message resulting in an in-flight state). Accordingly, initially the state of the conversation protocol formed in block 410 can have message count (0,0, . . . 0) and can be marked incomplete.

In block 420, a first incomplete state in the conversation protocol can be located and in decision block 430, if an incomplete state can be found in the conversation protocol, in block 440, the outbound send transitions of the located state can be constructed. For instance, for each outbound send transition of a participant state that was used to form the product state in the conversation protocol, a new transition can be added to the conversation protocol having the same label and originating from the incomplete state and terminating with another conversation protocol state with the same constituent local protocol states as the located incomplete state and the same message count as the incomplete state excepting that the message count for the message issued by the selected outbound send transition becomes incremented and the constituent local protocol state of the participant whose send transition gave rise to the new transition being added is replaced by the target state of the send transition in that participant's local protocol. Wherever the target state does not yet exist in the conversation protocol, the target state can be added.

In block 450, the outbound receive transitions of the located state likewise can be constructed. As before, for each outbound receive transition of a participant state that was used to form the product state in the conversation protocol that is for receipt of a message whose in-flight count is greater than zero in the located state a new transition can be added to the conversation protocol having the same label and originating from the incomplete state and terminating with another conversation protocol state with the same constituent local protocol states as the located incomplete state and the same message count as the incomplete state excepting that the count for the message received is decremented and the constituent local protocol state of the participant whose receive transition gave rise to the new transition being added is replaced by the target state of the receive transition in the participant's local protocol. Again, wherever the target state does not yet exist in the conversation protocol, the target state can be added.

Finally, in block 460 the incomplete state can be marked complete. Thereafter, in block 420, a next incomplete state in the conversation protocol can be located. In decision block 430, if an incomplete state can be located, the process can repeat through block 440. Otherwise, in block 470 all states in the conversation protocol whose constituent states that are all final in nature can be located and marked in block 480 as final conversation states. The resulting conversation protocol can be returned in block 490 as the conversation protocol for the set of roles. To the extent that no dead end states can be identified in the final conversation protocol, the local protocols for the corresponding roles can be considered compatible.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The computer usable storage medium can be an electronic, magnetic, optical, electromagnetic, infrared, or semiconductor system (or apparatus or device). Examples of a computer-readable (usable) storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk— read/write (CD-R/W) and DVD. With specific reference to a computer usable (readable) storage medium, it is to be understood that a computer usable (readable) storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method for testing protocol compatibility between roles in a business-to-business (B2B) conversation, the method comprising:
    selecting at least two roles with known interaction behavior for each participant to a B2B conversation over a computer communications network;
    deriving local protocols for each of the selected roles each in a form of a protocol state machine;
    constructing a single conversation protocol in a corresponding state machine from the local protocols by computing a product of the local protocols through forming an initial state of the single conversation protocol as a product of each initial state of each of the local protocols augmented by a message count comprising a tuple of non-negative integers, one for each defined message that indicates a number of message instances that are in flight in the initial state of the local protocols, with a position of each of the non-negative integers in the tuple corresponding to one or more different message types able to be exchanged so that sent messages sent to a participant increment a corresponding count in the tuple, and messages sent from the participant decrement the corresponding count in the tuple, constructing outbound send and receive transitions for each state in the single conversation protocol and marking states whose constituents are solely final states of the local protocols as final conversation states;
    determining if the state machine of the constructed single conversation protocol has a dead end state; and
    identifying protocol incompatibility when it is determined that a dead end state exists in the state machine of the constructed single conversation protocol, while identifying protocol compatibility in the absence of dead-end states in the state machine of the constructed single conversation protocol.

2. The method of claim 1, wherein
the selecting comprises selecting swimlanes for corresponding global process models, each swim lane corresponding to a selected role.

3. The method of claim 1, wherein
the local protocols for each of the selected roles are constructed by:
    labeling the global process model for a selected role;
    constructing and marking an execution state graph from the labeled global process model;
    constructing and populating a protocol state machine from the execution state graph; and,
    pruning the protocol state machine by dropping redundant protocol states.

4. The method of claim 3, wherein
the constructing and marking comprises:
    creating an empty execution state graph for the labeled global process model;
    determining initial token placements for the labeled global process model;
    adding initial nodes for each initial token placement to the execution state graph; and
    constructing successor nodes in the execution state graph for each node of the execution state graph that has no outgoing transitions and has not been marked final.

5. The method of claim 4, wherein
the constructing the successor nodes comprises:
    locating for an existing node of the execution state graph having no outgoing transitions, all immediate successor placements for an associated token placement of the existing node; and
    adding a transition to the existing node responsive to locating immediate successor placements to the associated token placement of the existing node and
    finding an existing node in the execution state graph corresponding to the immediate successor placements.

6. A computer program product comprising a non-transitory computer usable storage medium having stored therein computer usable program code for testing protocol compatibility between roles in a business-to-business (B2B) conversation, the computer usable program code, upon being executed by a computer hardware system, causes the computer hardware system to perform:
    selecting at least two roles with known interaction behavior for each participant to a B2B conversation over a computer communications network;
    deriving local protocols for each of the selected roles each in a form of a protocol state machine;
    constructing a single conversation protocol from the local protocols in a corresponding state machine by computing a product of the local protocols in a protocol state machine through forming an initial state of the single conversation protocol as a product of each initial state of each of the local protocols augmented by a message count comprising a tuple of non-negative integers, one for each defined message that indicates a number of message instances that are in flight in the initial state of the local protocols, with a position of each of the non-negative integers in the tuple corresponding to one or more different message types able to be exchanged so that sent messages sent to a participant increment a corresponding count in the tuple, and messages sent from the participant decrement the corresponding count in the tuple, constructing outbound send and receive transitions for each state in the single conversation protocol and marking states whose constituents are solely final states of the local protocols as final conversation states;

determining if the state machine of the constructed single conversation protocol has a dead end state; and identifying protocol incompatibility when it is determined that a dead end state exists in the protocol state machine of the constructed single conversation protocol, while identifying protocol compatibility in the absence of dead-end states in the state machine of the constructed single conversation protocol.

7. The computer program product of claim 6, wherein the selecting comprises selecting swimlanes for corresponding global process models, each swim lane corresponding to a selected role.

8. The computer program product of claim 6, wherein the local protocols for each of the selected roles are constructed by:
  labeling the global process model for a selected role;
  constructing and marking an execution state graph from the labeled global process model;
  constructing and populating a protocol state machine from the execution state graph; and,
  pruning the protocol state machine by dropping redundant protocol states.

9. The computer program product of claim 8, wherein the first constructing and marking comprises:
  creating an empty execution state graph for the labeled global process model;
  determining initial token placements for the labeled global process model;
  adding initial nodes for each initial token placement to the execution state graph; and
  constructing successor nodes in the execution state graph for each node of the execution state graph that has no outgoing transitions and has not been marked final.

10. The computer program product of claim 9, wherein the constructing the successor nodes comprises:
  locating for an existing node of the execution state graph having no outgoing transitions, all immediate successor placements for an associated token placement of the existing node; and
  adding a transition to the existing node responsive to locating immediate successor placements to the associated token placement of the existing node and
  finding an existing node in the execution state graph corresponding to the immediate successor placements.

11. A method comprising:
receiving a first conversation protocol for a first selected role corresponding to a first participant in a business to business (B2B) conversation;
receiving a second conversation protocol for a second selected role corresponding to a second participant in a B2B conversation;
creating, by machine logic, an execution state graph for a state machine, with the execution state graph including:
  (i) a plurality of nodes respectively corresponding to all states that a B2B conversation between the first and second participants can occupy, and
  (ii) a plurality of directional connections among and between the nodes of the plurality of nodes, with each directional connection including information indicative of how one state, corresponding to a node, can progress to another state, corresponding to another node;
determining, by machine logic, that no node of the plurality of nodes meets both of the following dead end conditions:
  (i) node does not correspond to a final state, and
  (ii) node has no directional connections leading from that node to another node of the plurality of nodes;
responsive to the determination that no node meets both of the dead end conditions, constructing a state machine corresponding to the state execution graph by forming an initial state of the state machine as a product of each initial state of each of the local protocols augmented by a message count comprising a tuple of non-negative integers, one for each defined message that indicates a number of message instances that are in flight in the initial state of the local protocols, with a position of each of the non-negative integers in the tuple corresponding to one or more different message types able to be exchanged so that sent messages sent to a participant increment a corresponding count in the tuple, and messages sent from the participant decrement the corresponding count in the tuple, constructing outbound send and receive transitions for each state in the state machine and marking states whose constituents are solely final states of the local protocols as final conversation states; and
using the state machine to identify protocol incompatibility between the first conversation protocol and the second conversation protocol.

* * * * *